Aug. 16, 1938.     I. M. LADDON     2,126,785
READILY DETACHABLE FAIRING
Filed Sept. 10, 1936
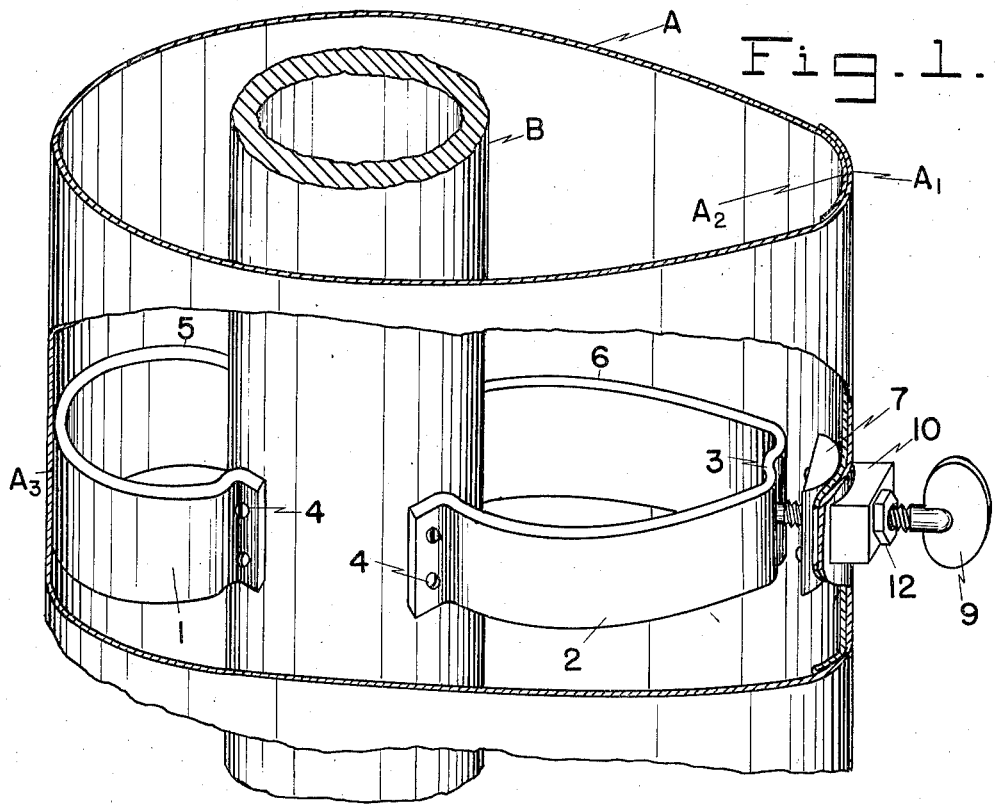
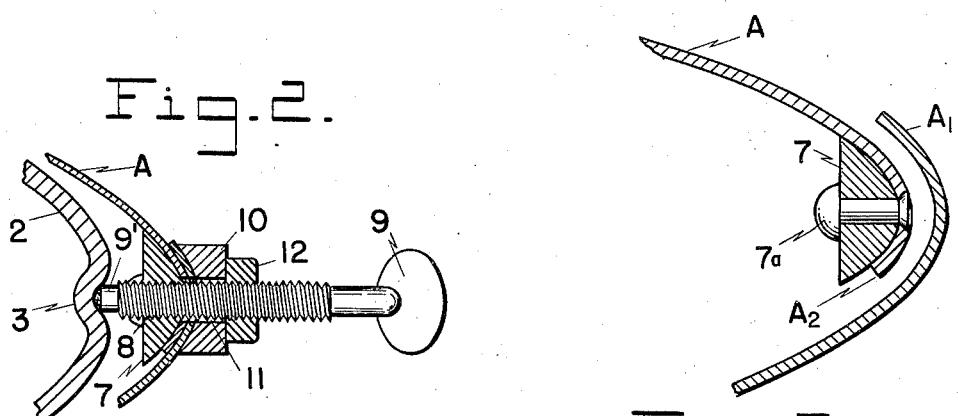
INVENTOR
Isaac M. Laddon.
BY *James M. Clark*
ATTORNEY Patented Aug. 16, 1938

2,126,785

UNITED STATES PATENT OFFICE 2,126,785

READILY DETACHABLE FAIRING

Isaac M. Laddon, San Diego, Calif., assignor to Consolidated Aircraft Corporation, a corporation of Delaware Application September 10, 1936, Serial No. 100,065

11 Claims. (Cl. 244—130)

This invention relates to the streamlining of rapidly moving objects and more particularly to fairings and improved devices for their attachment to struts or other aircraft members.

Many methods and devices have heretofore been proposed for the construction of fairings and their securement to structural members, such as aircraft struts and the like, but previous types have not met with general satisfaction as they invariably incurred one or more such objections as being unduly complicated, heavy, costly to manufacture, difficult to assemble and disassemble, and subject to becoming loose, rattling or turning about the strut due to the vibration and other forces to which such structures are commonly subjected.

It is very often desirable and necessary to provide streamline fairings to such structural parts of an aircraft as struts or braces exposed to the airstream, not alone for the generally known purpose of reducing the air resistance of the particular part, but for the additional purpose of providing a readily accessible space adjacent the strut through which control cables, fuel and oil piping, electric wiring and any number of other such lines may be conveniently passed between the different portions of the craft. Such fairings might also be applied to enclose landing gear struts and their associated shock absorber mechanism, this and the above equipment being subjected to frequent inspection and maintenance, and it is obviously desirable that the fairing be readily detachable and capable of being easily returned to its applied position by an attendant or other person without assistance or the need of any special tools.

These requirements are all adequately met by my improved construction wherein a one-piece fairing is rigidly attached to a strut and its associated former bracket or brackets by securing means positioned at the fairing trailing edge adapted to spreadingly engage the trailing portion of a former bracket such that the entire fairing is tensioned and effectively clamped to the brackets and/or the strut.

It is therefore an object of the present invention to provide a fairing and attachment assembly which are both light in weight and simple and economical to construct. It is also an object to provide an improved construction of this type which can be readily assembled, or detached when desired, and which requires a minimum number of readily accessible securing devices.

A further object resides in the provision of a one-piece fairing constructed of a relatively light sheet material which may be caused to retain the desired streamline form and to rigidly engage the strut and its associated formers by being tensioned by my improved attachment device. It is a further object of this invention to provide a securing means for such fairings whereby the fairings may be readily removed and easily reapplied to the strut, or strut formers, without the necessity of accurately positioning the fairing thereon in order to aline attachment openings or other fastening devices.

It is also an object of this invention to provide an improved device for securing a fairing to a strut former wherein the securing device will be self-centering in a lateral direction with respect to the strut axis and which permits of longitudinal positioning of the fairing with respect to the strut. It is a further object to provide such a one-piece fairing having its longitudinal edges lapped to form a reenforced trailing edge to accommodate the securing means.

With these and other objects in view, as will appear from reading the following specification, my invention consists of the novel features of construction and arrangement of parts hereinafter fully described, claimed, and illustrated in the accompanying drawing forming parts of this specification, and in which Fig. 1 is a perspective view of an aircraft strut and associated formers to which a fairing is attached, being shown partly cut away to expose the improved attachment device and forming a preferred embodiment of my invention;

Fig. 2 is an enlarged cross-sectional view showing the securing means attached to the trailing edge of the fairing and engaging the strut former; and Fig. 3 is an enlarged cross-sectional view of the fairing joint at the trailing edge in a partially disengaged position.

With reference to the drawing, A represents a one-piece sheet metal fairing having a rounded portion A3 forming its leading edge, and its marginal edges bent to a relatively smaller radius to form the lapped trailing edge portions A1 and A2. B represents a tubular aircraft strut to which substantially U-shaped formers or brackets 1 and 2 are attached as by the fastening means 4. Obviously the fairing and strut A and B respectively may be of considerable length, of which only a portion is shown, and a plurality of such pairs of brackets 1 and 2 and attachment devices will generally be required suitably spaced along the strut. The spaces within the brackets 1 and 2 provide a convenient passage for control cables, piping, wiring and other equipment which is readily accessible for inspection, installation or servicing.

The leading edge former 1 is preferably a sheet metal band bent to a radius which determines the form of the leading edge portion A3 of the fairing A and has its side faces 5 bent such that they engage the strut B at its outer surface where flanged portions are provided for the fastening screws 4. The trailing edge former 2 is also substantially U-shaped in form but somewhat more elongated in a fore and aft direction to suit the fairing profile and has similar bent portions at its ends forming flanges through which it is also attached to the strut B as by the screws 4. The trailing edge portion of the former bracket 2 is provided with a semi-cylindrical indentation 3 extending longitudinally with respect to the strut and the fairing and disposed opposite and adjacent the lapped trailing edges A1 and A2 of the latter.

The fairing A being of relatively thin sheet material, is capable of having its trailing edges A1 and A2 and its side portions spread sufficiently to permit it to be drawn over the brackets 1 and 2. These brackets are mounted upon the strut either permanently or detachably such that their axes aline in a fore and aft direction, normally in the direction of the relative airstream and are adapted to establish a similar positioning of the fairing A. The inner trailing edge A2 of the fairing has a block 7 riveted or otherwise fastened to the inner surface thereof as indicated at 7a, being flush with the outer surface of A2. This block has its rearward or convex surface of substantially streamline form and complemental to the concave inner surface of the fairing edge A2 to which it is attached. The block is further provided with a threaded opening 8 extending in the direction of the transverse axis of the fairing and is adapted to receive the thumbscrew 9.

Both trailing edges A1 and A2 are provided with unthreaded openings which, in the assembled relationship of the fairing with the struts and the associated formers, aline with the threaded opening 8 in the block 7 and also with the axis of the semi-cylindrical groove 3 in the bracket 2. The thumbscrew 9 has a rounded or otherwise convex point 9' adapted to engage the indentation 3 in a manner to permit rotational movement thereagainst such that tightening of the thumbscrew 9 causes a separating or spreading movement between the rigid bracket 2 and the block 7 with its associated fairing trailing edges. A block or washer 10, having a concave surface complemental to, and engaging the trailing edge A1, is provided with an unthreaded opening 11 through which the thumbscrew 9 may be freely passed and rotated. A lock nut 12 threadedly engages the thumbscrew 9, and when turned to bear tightly against the outer plane surface of the washer 10, serves to lock the thumbscrew in the desired position.

From the above description and the drawing it will be obvious to those versed in the art that the fairing A can readily be positioned for mounting upon the brackets by turning the fairing about until it assumes the general fore and aft alinement established by the brackets, whereupon tightening of the thumbscrew will usually result in the end 9' engaging either the groove 3 or its inwardly extending side portions. Engagement of the point 9' with the latter will result in its being automatically centered with the groove upon further rotation of the screw. Once the fairing A is properly positioned on its fore and aft axis the thumbscrew end 9' engages the groove 3 at any point therealong which might be determined by the positioning of the fairing longitudinally of the strut. This permits the assembler a reasonable degree of freedom in positioning the fairing lengthwise of the strut in order to meet any assembling requirements, and it obviates the necessity of accurately alining openings in the fairings with similar openings in the former brackets which condition forms a serious objection to prior devices.

When properly positioned the fairing may be rigidly secured by merely inserting and tightening the thumbscrew 9 and the lock nut 12, resulting in a stretching or tensioning action of the fairing causing it to come into contact with the mounting brackets 1 and 2 at considerable portions of their outer surfaces as indicated at 5 and 6, and to assume the desired streamline form. The fairing is thus caused to bear snugly against the brackets as a result of this clamping effect which can at any time be increased by further tightening of the thumbscrews, thereby insuring a tight and rigid joint at all times. It will be obvious that detachment is readily accomplished by simply reversing this procedure.

It is to be understood that the drawing and the above description disclose a preferred embodiment of my invention and are for purposes of illustration only, and various changes and modifications which may occur to one skilled in the art are to be considered within the scope and spirit of this invention.

I claim as my invention:

1. The combination with an aircraft member, of a fairing enclosing the member, and attachment means adapted when expanded to tension the fairing and detachably clamp the same to the member.

2. In aircraft construction, a strut, a one-piece sheet fairing coaxial with said strut, and screw means adapted when put under compression to tension the said fairing whereby it is clamped to the said strut.

3. In aircraft construction, a strut, a fairing, bracket means attached to the said strut, and expansible screw means adapted to attach said fairing to said bracket means by separation of a portion of said bracket means from an opposed portion of said fairing.

4. In aircraft construction, a strut, a fairing, a bracket attached to the said strut, and means adapted to separate adjacent portions of the said fairing and bracket whereby remaining portions of each are brought into frictional engagement, the said means having an operating portion extending through the said fairing.

5. In aircraft construction, a strut, a fairing, bracket means associated with said strut, and screw attachment means associated with a portion of said fairing, the said attachment means upon rotation being adapted to expand and secure the said fairing to the said bracket means by spreading engagement with a portion only of said bracket means.

6. In aircraft construction, a strut, a fairing, bracket means adapted to engage the said strut, and screw means interposed between opposed portions of said fairing and said bracket means adapted to clamp the said fairing to the bracket means when rotated to cause separation of said interposed portions.

7. In aircraft, a strut extending between portions of the aircraft exposed to the relative airstream, a one-piece fairing adapted to embrace the said strut, the said fairing having a rounded leading edge and overlapping at its trailing edge, and screw attachment means separating the trailing edge from the strut whereby the leading edge is securely clamped to the strut.

8. In aircraft construction, a strut, a one-piece fairing of streamline form, bracket means associated with the said strut, the said fairing having lapped edges adapted to form a trailing edge, and fairing attachment means adapted to simultaneously tension the said fairing and maintain the lapped relationship of said fairing edges, whereby the said tensioning results in embracing engagement of the said fairing with the said bracket means.

9. In a detachable fairing for aircraft, a strut having an indented portion, a streamlined fairing embracing the said strut, an element having a threaded opening associated with said fairing, and rotatable screw means threadedly engaging said element and adapted upon rotation to bear against said indented portion for separation from said element whereby the fairing is attached to the said strut.

10. In aircraft construction, a strut, bracket means attached to the said strut, a spreadable fairing adapted to enclose the said strut and bracket means with a substantially continuous surface exposed to the air-stream, the said fairing having lapped edges forming its trailing edge portion, screw means engaging the said fairing trailing edge and an adjacent portion of the said bracket means, whereby tightening of the said screw means results in a fixed and continuously enclosing relationship of said fairing with respect to said bracket means and strut.

11. In aircraft construction, a strut, bracket means attached to said strut, a fairing adapted to enclose the said strut and bracket means, the said fairing having edges extending lengthwise of the said strut, the said fairing edges adapted to lappingly engage each other presenting a substantially continuous surface exposed to the air-stream, a threaded member attached to one of the said fairing edges, an indented portion on said bracket means, screw means engaging the said threaded member and the said indented bracket portion adapted to cause outward movement of said member with respect to the said indented portion whereby the said fairing is caused to clampingly enclose the said bracket means with its edge portions in continuously lapping engagement.

ISAAC M. LADDON.